United States Patent
Matthew

(10) Patent No.: US 7,457,679 B2
(45) Date of Patent: Nov. 25, 2008

(54) SOLID MODEL OF STATISTICAL PROCESS CONTROL

(76) Inventor: Bob Matthew, 10171 Aqueduct Dr., Cypress, CA (US) 90630-4109

(*) Notice: Subject to any disclaimer, the term of this patent is extended or adjusted under 35 U.S.C. 154(b) by 0 days.

(21) Appl. No.: 10/908,629

(22) Filed: May 19, 2005

(65) Prior Publication Data

US 2007/0168069 A1    Jul. 19, 2007

(51) Int. Cl.
*G06F 19/00* (2006.01)
(52) U.S. Cl. ............... 700/109; 700/51; 702/84; 702/182; 708/806
(58) Field of Classification Search ......... 700/108–110, 700/29, 30, 32, 33, 80, 51; 702/81–84, 179, 702/182, 183; 708/806; 709/203; 705/7, 705/22, 28
See application file for complete search history.

(56) References Cited

U.S. PATENT DOCUMENTS

| | | | | |
|---|---|---|---|---|
| 5,987,398 A * | 11/1999 | Halverson et al. | ........... | 702/179 |
| 6,801,828 B2 * | 10/2004 | Popp et al. | ........... | 700/122 |
| 6,845,278 B2 * | 1/2005 | Popp et al. | ........... | 700/109 |
| 6,850,806 B2 * | 2/2005 | Yutkowitz | ........... | 702/185 |
| 2004/0088211 A1 * | 5/2004 | Kakouros et al. | ........... | 705/10 |
| 2005/0171626 A1 * | 8/2005 | Schwarm | ........... | 700/108 |

* cited by examiner

*Primary Examiner*—Albert DeCady
*Assistant Examiner*—Charles R Kasenge
(74) *Attorney, Agent, or Firm*—Michael L. Greenberg, Esq.; Greenberg & Lieberman, LLC

(57) ABSTRACT

A computer based proactive process control technique used to predict the capability of a manufacturing process. A solid model of statistical process control is created by a computer program to simulate the Bell Curve of the data or the data with in +/−3 standard deviation. With product knowledge and process knowledge, it is possible to setup and control the manufacturing process to yield a desired level. The computer program operates within a communication media network. Suppliers and manufactures through their main servers are connected to floor computers, which are data input and output computers. All the servers are connected to the main server of a prime contractor. Manufacturing data from the supplier's field computers goes to their respective servers, and that data in turn goes to the main server of the prime contractor. From the prime contractor server, the data can be retrieved through computers that are data reviewing stations.

3 Claims, 10 Drawing Sheets

FIG 9

Figure 1:
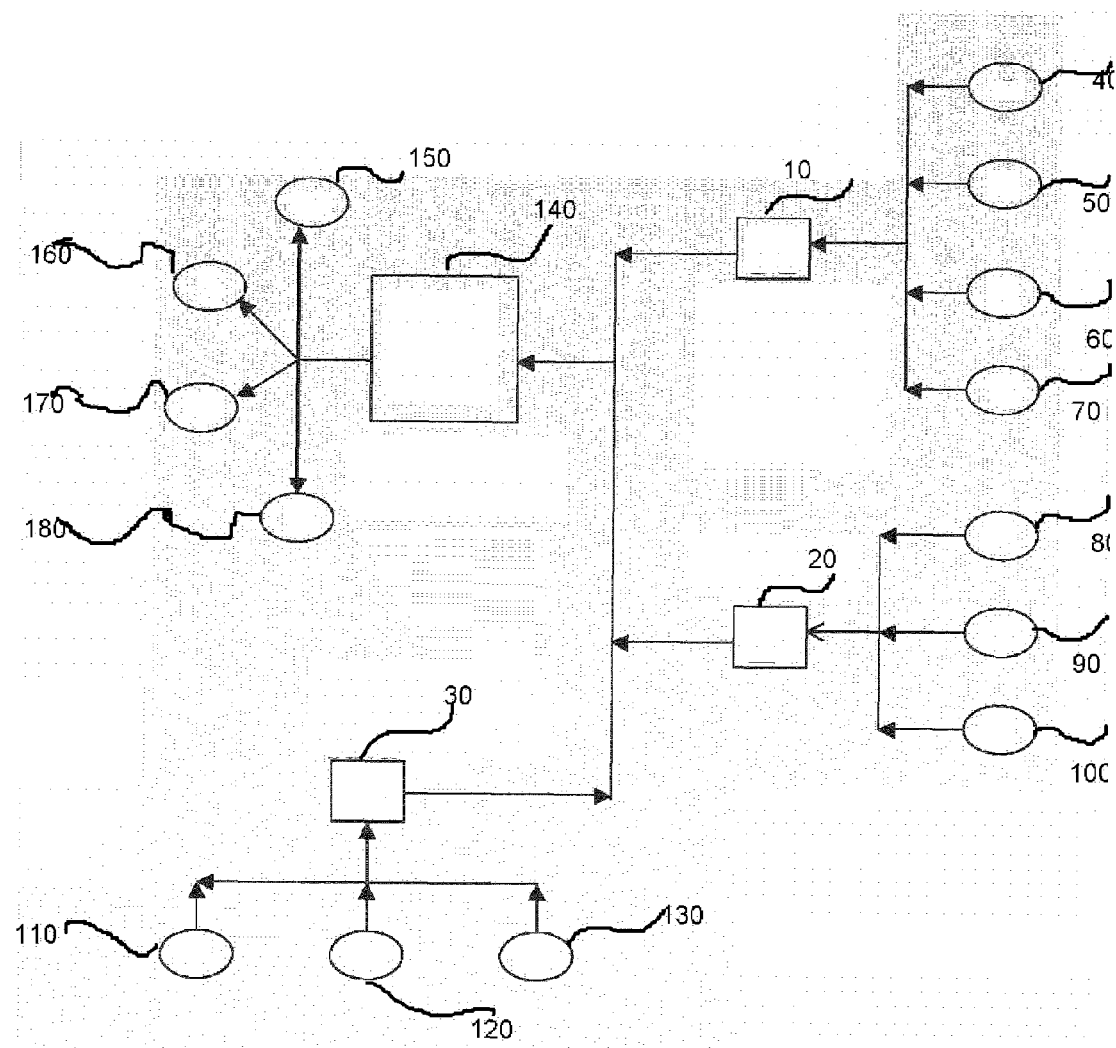

ODC Form (Matrix) for Six Sigma Process Yield

INPUT SCREEN - MASTER DATA OF A PART OR A PRODUCT
Customer:                                                              Project:
                        Date:
Drawing #:                                                             Revision:
                        Process:
Lot #:                                                                                 Serial #:
                                        Item #:
Process ID:                                                            Description:
                        Machine #:
Specific Notes:

INPUT SCREEN - MASTER SPECIFICATION OR ENGINEERING REQUIREMENT
DIMENSION: (1) Basic:          Plus:            Minus:
           (2) Range:          Upper:           Lower:
           (3) True Position Tolerance:         MMC / LMC

*OUTPUT SCREEN - DERIVED MASTER SPECIFICATION*
Derived                        Derived                         Derived
Dimension:                     Tolerance: +/-                  Standard Deviation: ?
                                                               [Machine Capability]

*Table shows the Limit of Dimensions with in +/- 3$\sigma$*
X-3$\sigma$  X-2$\sigma$  X-1$\sigma$  X  X+1$\sigma$  X+2$\sigma$  X+3$\sigma$

| | | | | | | |
|---|---|---|---|---|---|---|
| | | | | | | |

Show the Machine (s) Capable to do this job: #1 _____

SAMPLE DATA FROM PRODUCTION LOT FOR STATISTICAL ANALYSIS ONLY
Time    Sample #1    Sample #2    Sample #3    Sample #4    Sample #5

| | | | | |
|---|---|---|---|---|
| | | | | |

Sample Standard Deviation: $\sigma$ =    Sample Mean:       Cp:         Cpk:
[1] Show X bar & R chart
[2] Print X bar & R chart
[3] Show the Bell Curve for the Sample Data
[4] Print all Derived Master Specification for a given Drawing # & Revision
[5] Highlight a Derived Dimension and select the limit, Upper & Lower
[6] Transfer the highlighted Derived Dimension to CNC Machine or Tape or Floppy
[7] Search Master Data
[8] Search Derived Master Specification

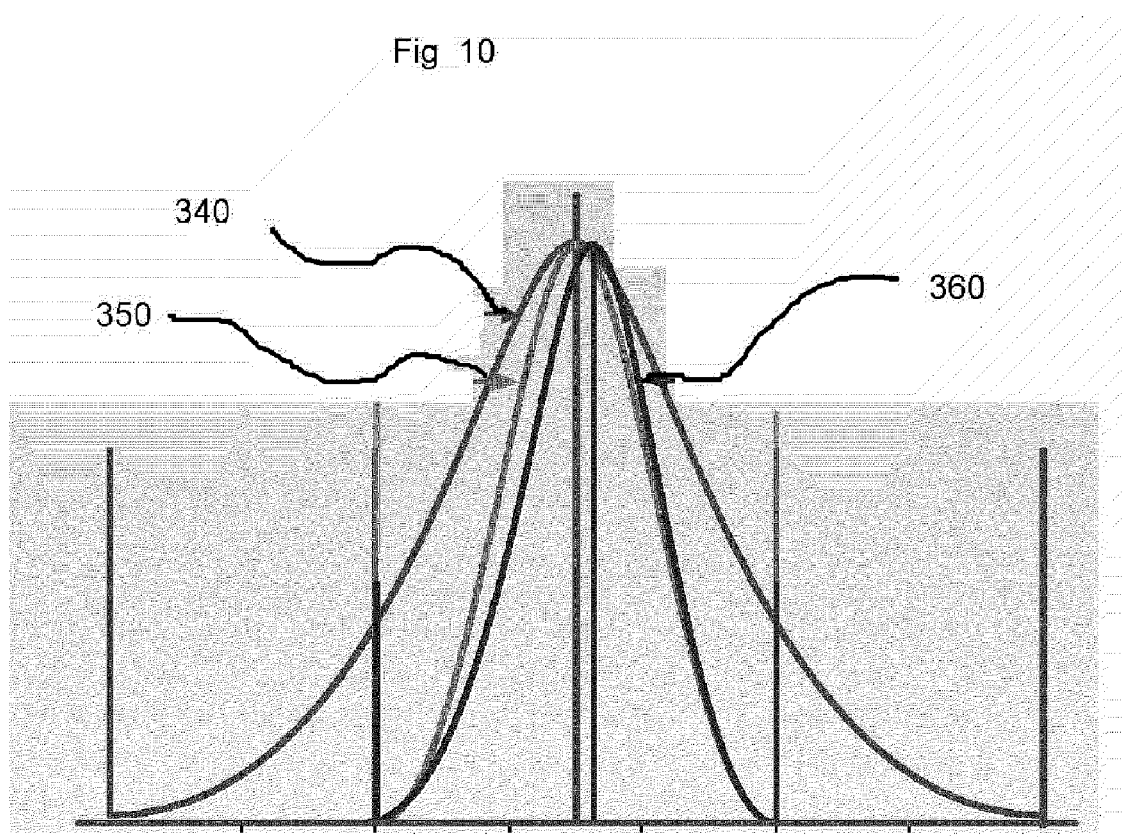

SOLID MODEL OF STATISTICAL PROCESS CONTROL

FIELD OF THE INVENTION

The present invention relates in general to a process control method, more particularly to a computer program based method for discovering, if manufacturing processes are efficient, capable, and predictable, without the use of historical statistical data for statistical analysis to determine the capability of the manufacturing process, creating/testing prototypes or collecting inspection data for statistical analysis, thus reducing cost and time spent on the manufacturing process.

BACKGROUND OF THE INVENTION

The complexity of today's highly competitive industries requires that products be manufactured in as short a period as possible, as well as in a cost efficient manner. Product managers and manufacturing managers must implement a system of designing, developing, and production to bring a product to the market for the least cost, within proper time frame, while sustaining product quality. Further complicating, the market constantly shifts, with the introduction of "new and improved" items, causing some products to be viable for only six months to one year. Thus product and manufacturing managers need sufficient information to implement the most efficient system of operation.

Many manufacturing industries employ statistical methodology, such as statistical process control, to control the manufacturing process. In statistical process control (SPC), processes are controlled from the data collected from samples drawn at certain intervals and studied for the behavior of process. SPC is used in the manufacturing process to asses if the process is capable and predictable. In order to assess the process an abundance of data is necessary, making SPC a data driven process. Yet, before manufactures can apply SPC, a prototype must be made first. This prototype then goes through a series of quality and reality tests. Data is collected during the tests to modify the engineering drawing idea to strengthen the product or process. Once the manufacturing process begins inspection and collection of data is done to study the health of the process by conducting SPC.

The application of SPC begins with the collection of samples and measure of features. An X-bar and R-chart is plotted to see if the process causes the parts to fall with in the control limits. If the values fall with in the limit, then the products are considered statistically acceptable. If the values fall beyond the limit, then the cause of the variation is investigated and corrected so that the process yields the desired output. This kind of trial and error method to control the process has proven to be good, provided the volume of production is high, however it requires reliable data and controlling of all variables in a manufacturing process, as well as performing tests on prototypes. Thus this kind of process control method becomes an expensive and time-consuming task.

The very nature of SPC is one of trial-and-error guesswork with an inherent deficiency of it's own, known as margin of error. There are many variables to manipulate, causing a mass amount of time to be devoted to fine tuning the process of a product to determine the correct process step or strength of the process. Methods employing this trial-and-error form of SPC are not proactive process control techniques, meaning they are after the fact or reactive process control techniques. This aspect of SPC, along with the large costs associated with creating and testing prototypes, is undesirable to manufacturing industries where time and resources are limited. The manufacturing environment changes over time, which makes the expensive development costs of process models employing this form of SPC not practical and unrealistic. Manufacturing industries are seeking for a proactive process control technique that is not expensive, yet very effective.

Therefore, there is a need within the manufacturing industry for a methodology that makes the manufacturing process proactive rather than a reactive process by predicting the capability of a process without having sample data, thus eliminating the cost of application of traditional SPC and need to impose control on key characteristics. Such a technique will be cost saving, time saving, produce a prime quality product, and higher product yield.

SUMMARY OF THE INVENTION

The present invention improves upon various previous methods of process control by providing a solid model of statistical process control through the use of a computer program to integrate quality, producibility, and customer requirements to help and control the manufacturing process to yield 99.9% or above. The present invention performs these tasks without the additional costs associated creating, testing, and compiling data on sample prototypes.

It is the object of the present invention to make the reactive process control technique of SPC into a proactive process control technique or reverse SPC. Research and study on the behavior of the application of SPC reveal, the key element in the process has been narrowed down to standard deviation. Examining the formulae below, one element plays very important role in statistics, that is the standard deviation=$\sigma$ $$Cp = \frac{USL - LSL}{6\sigma}$$

$$\text{Where, } \sigma = \frac{R}{d_2}$$

$$Cpk = \min \text{ of } Cpl \text{ or } Cpu$$

$$Cpl = \frac{X - LSL}{3\sigma}$$

$$Cpu = \frac{USL - X}{3\sigma}$$

Given that the standard deviation plays a key role in the process of making the statistical balancing of a manufacturing process, the present invention eliminates all other elements of SPC and gives priority to standard deviation and employs a technique to electronically process variable and work in reverse order to save time and cost.

A solid model of statistical process control is created by a computer program to simulate the Bell Curve of the data or the data with in +/−3 standard deviation windows for values entered prior to manufacturing. The invention also creates a theoretical standard deviation for the values entered, into the program. Theoretical standard deviation will be known as "machine capability." The invention's computer program also can be used to create values for a given engineering specification or dimension to fit into the windows. The user may select two variables from the windows, to represent the upper limit and lower limit of the process being planned. The user then can work with the selected variables instead of taking the whole dimension given by the engineering specification drawing in the computer. With product knowledge and process knowledge, it is possible to control the process to yield a desired level.

The invention's computer program operates through a system that is a communication media network within the corporate management & customer and flows down to the in-house manufacturing floor and to the outside suppliers. Suppliers and manufactures through their main servers are connected to floor computers, which are data input and output computers. All the servers are connected to the main server of a prime contractor. Manufacturing data from the supplier's field computers goes to their respective servers and that data in turn goes to the main server of the prime contractor. From the prime contractor server, the data can be retrieved through computers that are data reviewing stations. This new system of online data review, will help users to visualize the real-time quality of a product manufactured anywhere in the country or world and also predict the timeliness of delivery of products to them.

DETAILED DESCRIPTION

In the manufacturing process variations are likely to happen, and this is normal and inherent. Yet when the variations are abnormal, problems arise. The present invention seeks to prevent abnormal variations in a process, using a computer program and network system.

FIG. 1 illustrates the communication media network within the corporate management & customer, which flows down to the in-house manufacturing floor and to the outside suppliers. Such a system brings a clear visibility in to the entire manufacturing process leaving no element unknown throughout the process. Suppliers and manufactures through their main servers, supplier servers 10, 20, 30, are connected to data input and output floor computers 40, 50, 60, 70, 80, 90, 100, 110, 120, 130. All the supplier servers 10, 20, 30, are connected to a prime contractor main server 140 such as industries like Aerospace, Automotive, Medical, Defense and General etc.

Manufacturing data from the supplier's data input and output floor computers 40, 50, 60, 70, 80, 90, 100, 110, 120, 130 goes to their respective supplier servers 10, 20, 30 and that data in turn goes to the prime contractor main server 140. From the prime contractor server, the data can be retrieved through computers that are data reviewing stations 150, 160, 170, 180.

This new system of online data review, will help users to visualize the real-time quality of a product manufactured anywhere in the country or world and also predict the timeliness of delivery of products to them.

This network employed by the present invention eliminates the traditional application of SPC (an after the fact process to control the manufacturing process) to a proactive strategy with tremendous cost saving to the customers and the suppliers. Corporate supplier managers can monitor their suppliers manufacturing process anywhere in the world on their computer screen, while the manufacturing process is in progress.

Given that the standard deviation plays a key role in the process of making the statistical balancing of a manufacturing process, the present gives priority to standard deviation and employs a technique to electronically process variable and work in reverse order, thus saving time and cost expenditure.

Figure 2:
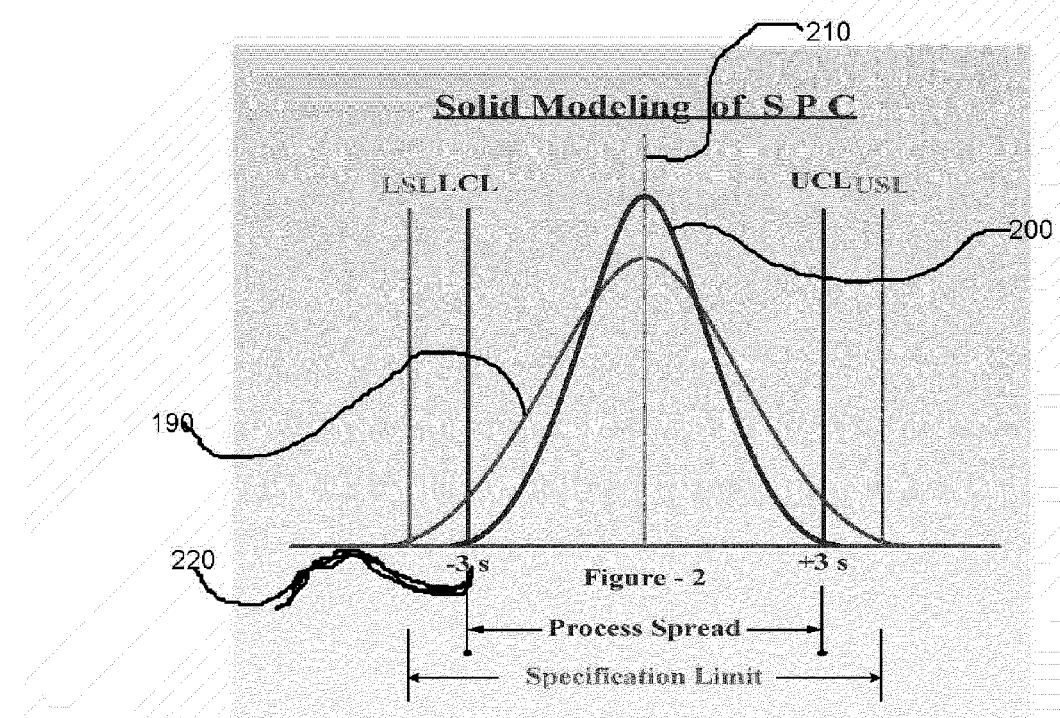

FIG. 2 illustrates the limits of engineering specification and limits of a process spread. Through methodology employed through the present invention to set up the engineering specified variables 190 within the process limit 200, than we may achieve product yield 210 of about 99.3% that is with in 1-3 standard deviation. In FIG. 2 the standard deviation 220 of the process spread 230 will be less than the engineering specification spread 240.

Figure 3:
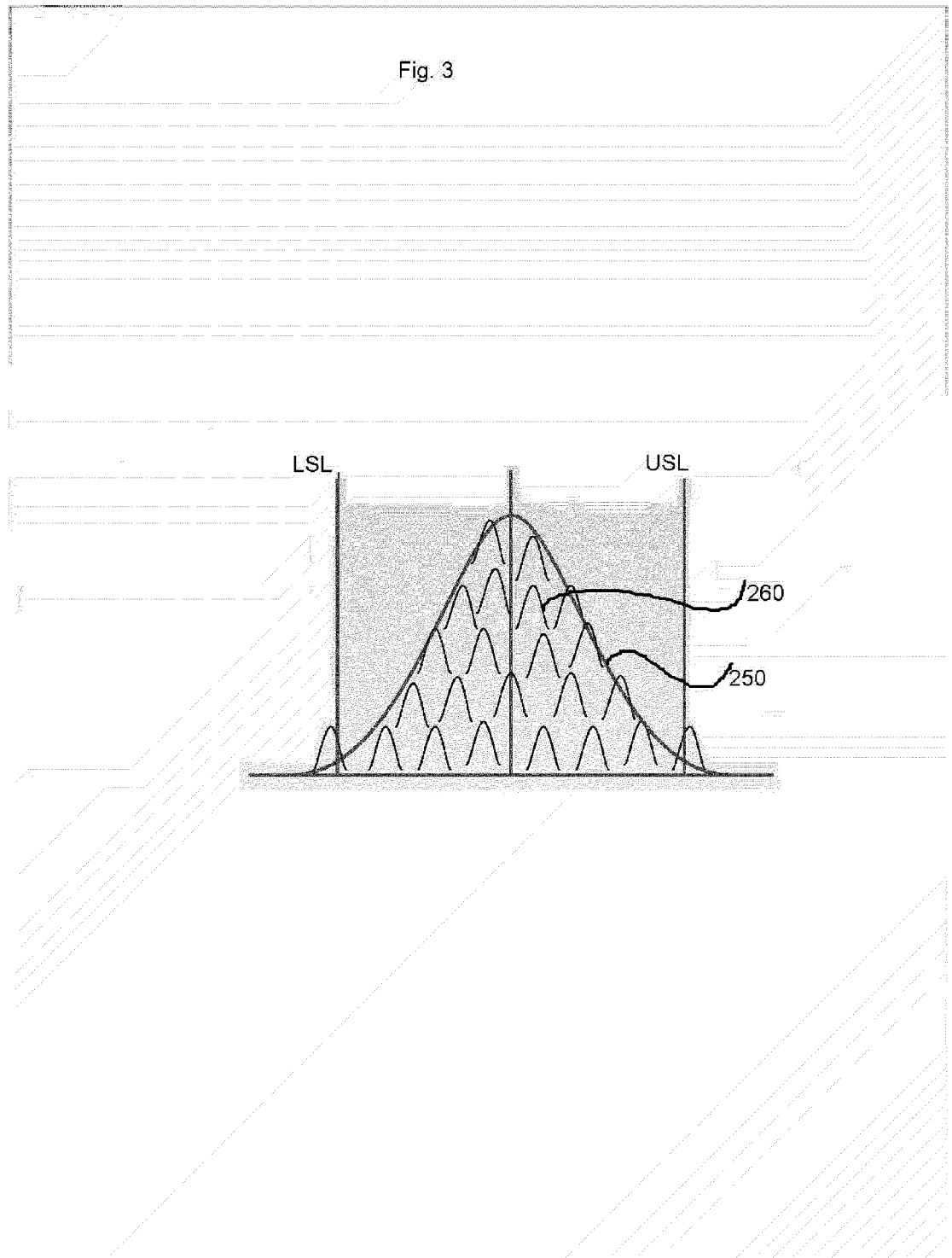
Figure 4:
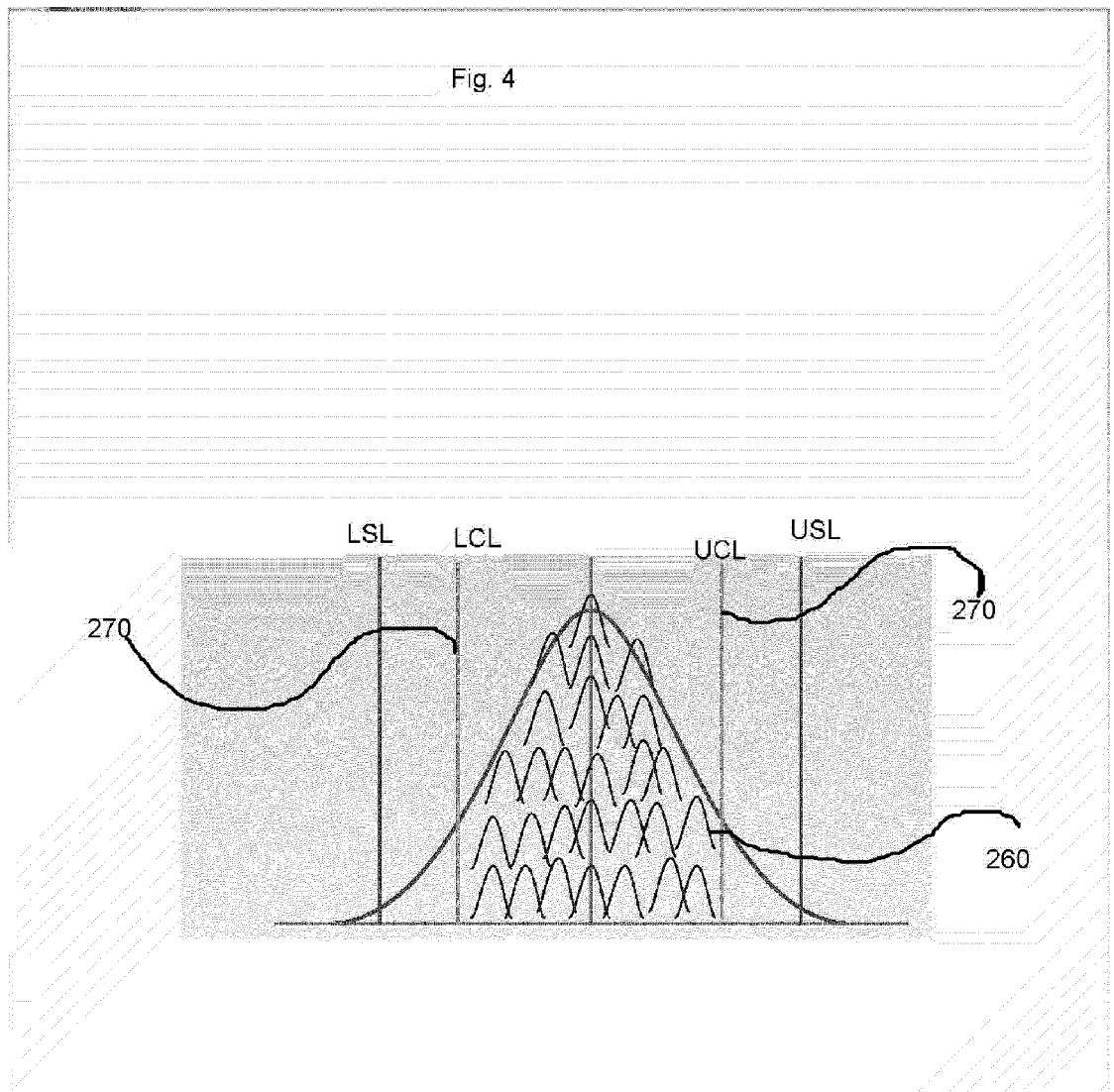

Furthermore take for example analyzing the whole quality of components that build an aircraft. FIG. 3 shows, in a bell curve format 250 with a specified amount of components. After implementing the present invention, product quality (whole assembly of an aircraft) will resemble the illustration in FIG. 4, where most components 260 fall more closely within control limits 270.

Figure 5:
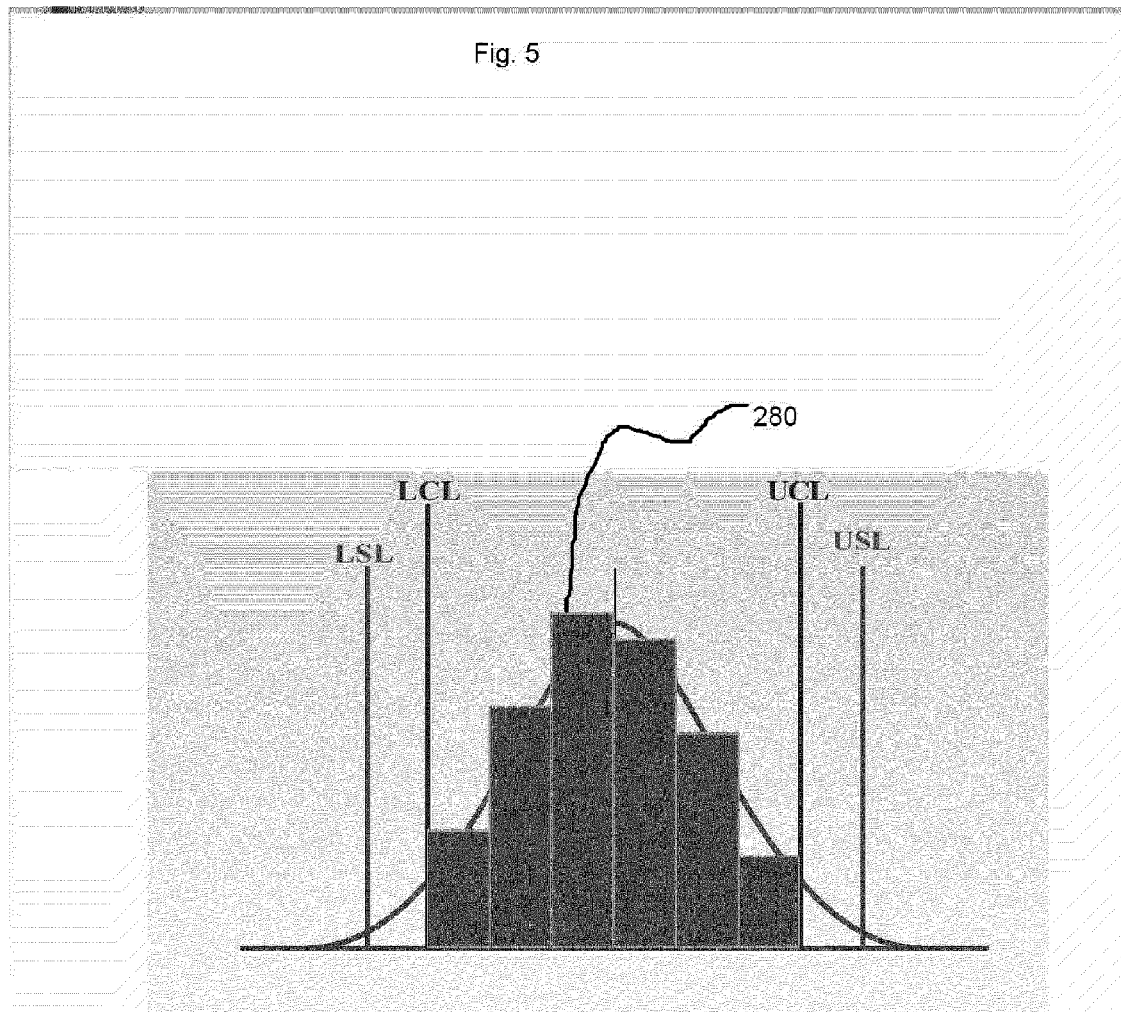
Figure 6:
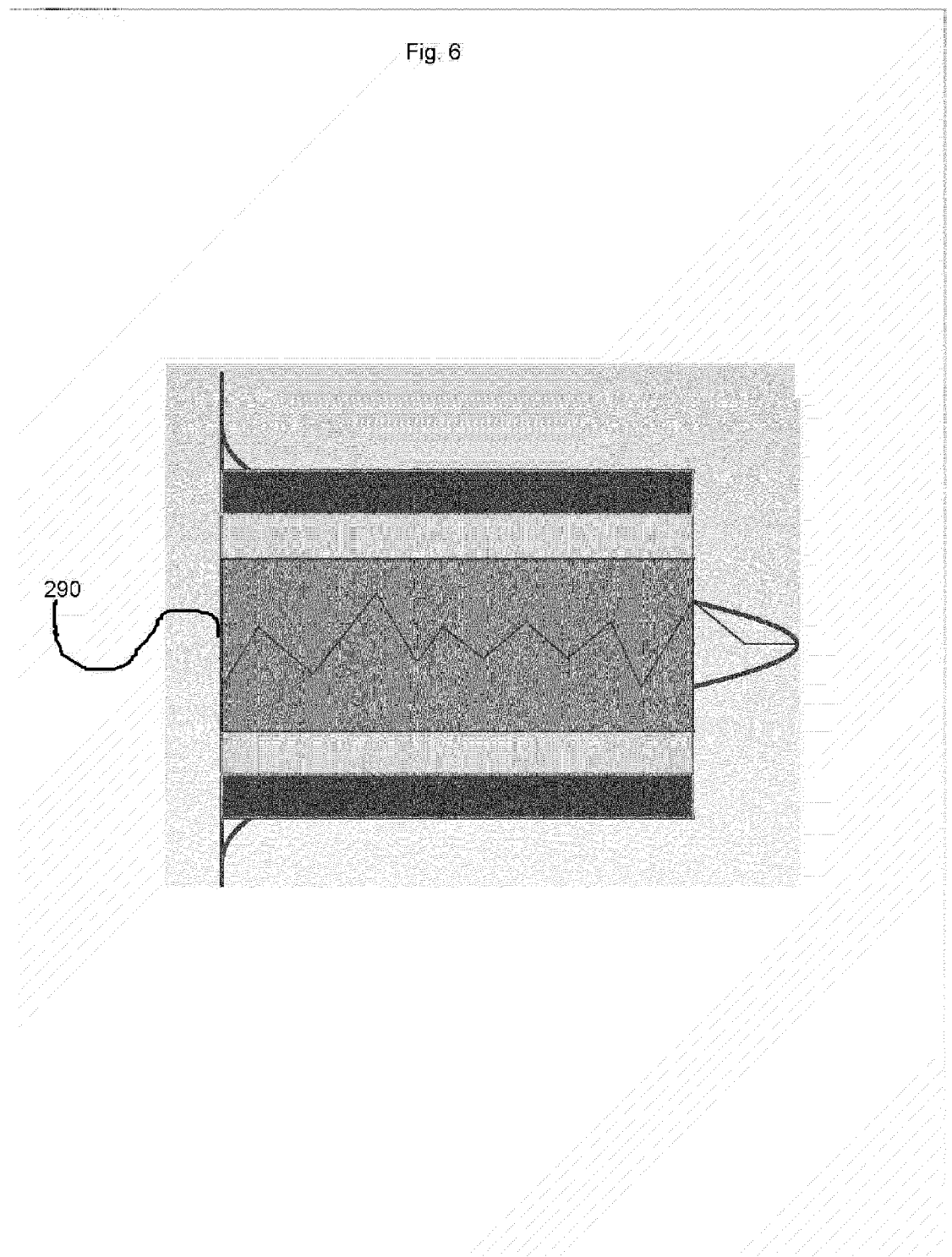
Figure 7:
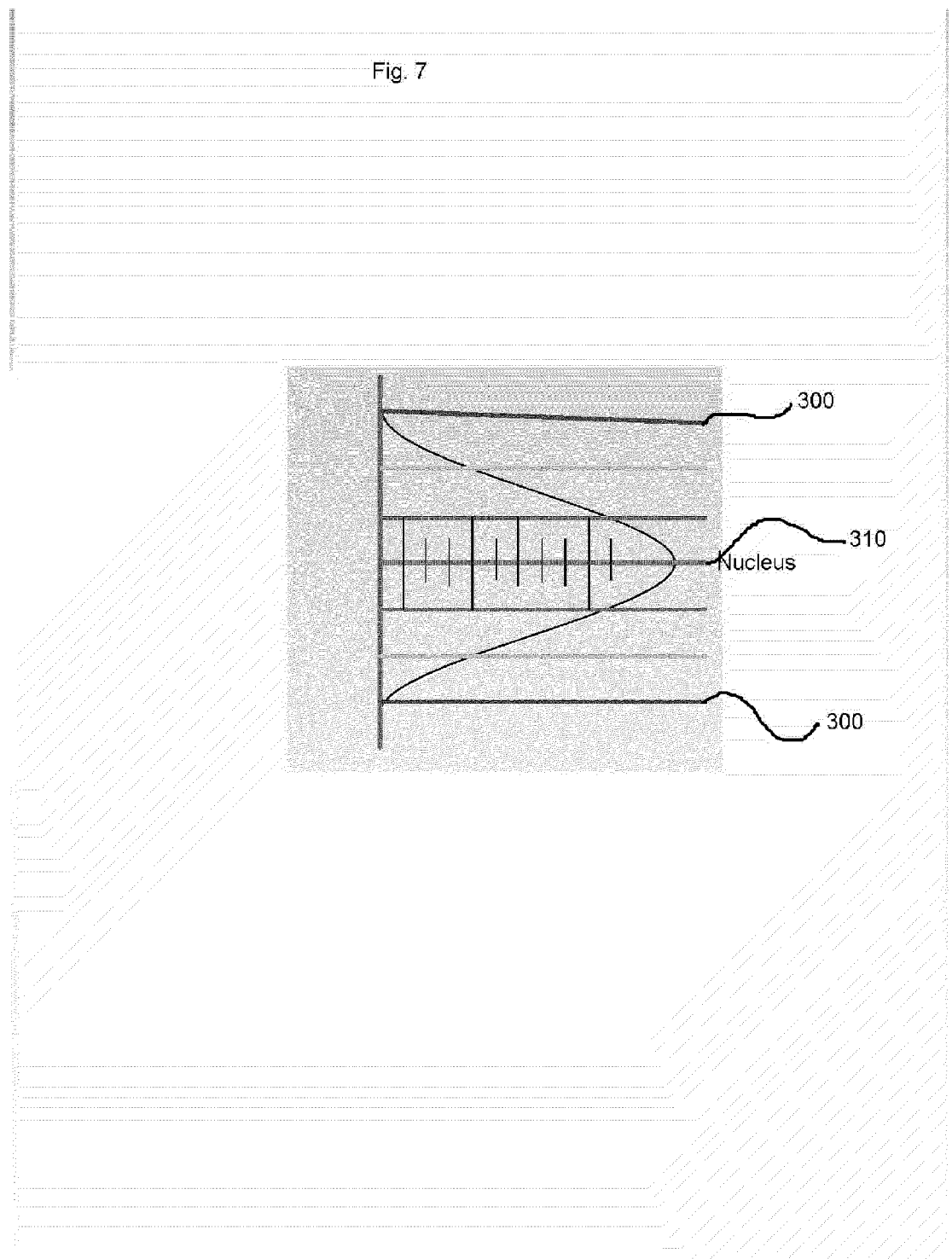

The present invention seeks to control all the variables in an engineering design or specification during the manufacturing process, so that a graph illustrating the process 280 would look like the graph shown in FIG. 5 or narrower. In order to achieve good control on all variables a system is created that channels all the variables during manufacturing, through a predetermined band 290 as displayed in FIG. 6. As illustrated in FIG. 7, after use of the present invention's methodology, the path of variable spread 300 will be around a nucleus 310.

Figure 8:
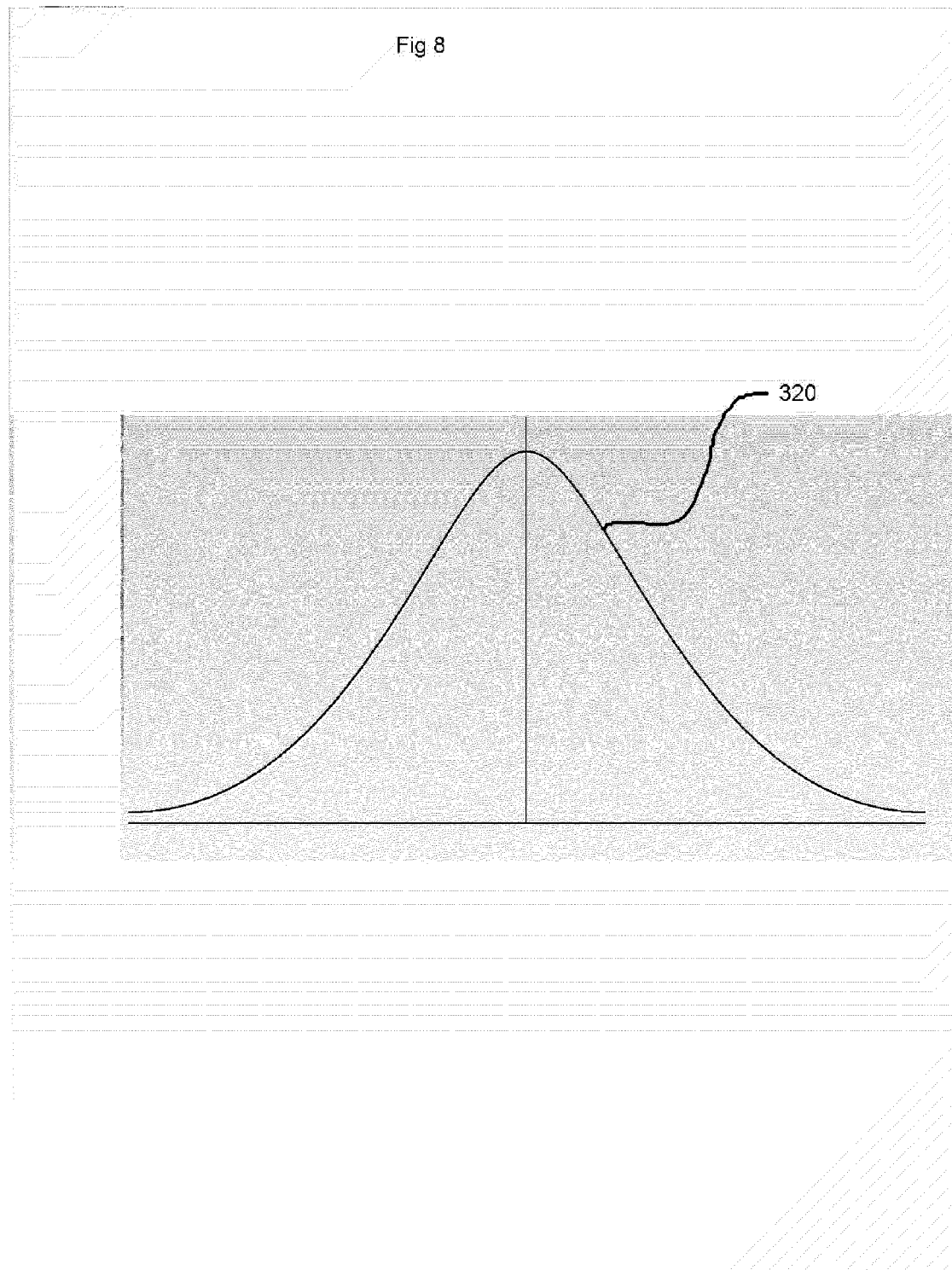

The computer program employed creates a solid model to stimulate the Bell Curve 320, shown in FIG. 8, of the data or the data with in +/−3 standard deviation windows for the values entered prior to manufacturing. The invention also creates a theoretical standard deviation, machine capability, for the values entered, into the program.

The program derives control parameters that can be used to set up a given manufacturing process that is capable and predictable without any sample data.

Take for example, a circuit board assembly, where there are six elements. To get 85% yield, each element of the board must have a yield of 0.97327 or 97.327%, to expect a first time board yield of 85%. In order to determine a proper process the present invention may be employed. As a first step, all variables in a design or specification need to identified with serial numbers, 1, 2, 3, 4, etc. This is to identify all the requirements in an engineering drawing/specification/contractual requirement. Serialization is only for trace ability purposes.

In the present invention, common cause variations are reduced by process redesign. The standard deviation of the population is replaced with a theoretical standard deviation, small sigma=σ, that is equal to the machine capability, created from engineering design values or specification entered into the program. To make the program work, assume that all the variables in a design are considered fit with in a standard Bell Curve. The software program creates a theoretical standard deviation, machine capability, for all the variables input. This process is to bring all the design variables or specification data in a standard format without loosing the design intent. QDC form 330, a new matrix shown in FIG. 9 is used to accomplish this task, which provides the user data to analyze statistically to see if the process was under control. QDC Form 330 or matrix is the document that identifies all the control factors necessary to produce a product, to meet the design requirement when process is finished. Users can review this electronic matrix any time to assure the compliance. Sharing the electronic file can reduce the amount of paperwork saving a portion of the cost by the supplier and customer.

After entering all the variables, QDC Form can be printed out for further processing, by selecting the variable under X and programming the (CNC) machine to this variable. After CNC program, verify all the variables are programmed to the nominal value under X, from the matrix. Select the machine (s) that has the capability to hold the least of the standard deviations from the matrix. For Example, 0.001", selected from a group of machine capabilities: 0.002", 0.003", 0.004", 0.005", and 0.0.001".

FIG. 10 shows a process planned and controlled according to the present invention has yielded more than expected. Shown in FIG. 10 is the specification limit 340, engineering value from SPC Solid Model selected before processing 350, and the actual yield of the product produced using the SPC Solid Model data 360.

The present invention has benefits not present in other known process control methods in that the present invention allows a user to plan and execute a known manufacturing process with out any old data derived from the testing/creating of sample prototypes or analyzing a process after it is done. Thus it is cost saving by optimizing the manufacturing process, enhances visibility in the entire manufacturing process, and helps yield a higher quality product.

What is claimed is:

1. A computer system for monitoring a product or process, comprising:
   receiving a first data input in the form of hypothetical desired product or process specifications;
   receiving a second data input;
   performing a first standard deviation calculation for said first data input;
   performing a second standard deviation calculation for said second data input;
   setting tolerance levels for differences between said first standard deviation calculation and said second standard deviation calculation; and
   responding to said differences if said differences exceed said tolerance levels;
   wherein said first data input is received on a manufacturer side computer;
   wherein said second data input is received on a distributor side computer; and
   wherein a server communicates with said manufacturer side computer and said distributor side computer to determine said first standard deviation calculation and said second standard deviation calculation.

2. A computer system for monitoring a product or process, comprising:
   receiving a first data input in the form of hypothetical desired product or process specifications;
   receiving a second data input;
   performing a first standard deviation calculation for said first data input;
   performing a second standard deviation calculation for said second data input;
   setting tolerance levels for differences between said first standard deviation calculation and said second standard deviation calculation; and
   responding to said differences if said differences exceed said tolerance levels;
   wherein said first data input is received on a manufacturer side computer;
   wherein said second data input is received on a distributor side computer; and
   wherein a server determines whether said responding to said differences should occur.

3. A computer system for monitoring a product or process, comprising:
   receiving a first data input in the form of hypothetical desired product or process specifications;
   receiving a second data input;
   performing a first standard deviation calculation for said first data input;
   performing a second standard deviation calculation for said second data input;
   setting tolerance levels for differences between said first standard deviation calculation and said second standard deviation calculation; and
   responding to said differences if said differences exceed said tolerance levels;
   wherein said first data input is received on a manufacturer side computer;
   wherein said second data input is received on a distributor side computer; and
   wherein said responding to said differences if said differences exceed said tolerance levels is adjusting said tolerance levels if said differences between said first standard deviation calculation and said second standard deviation calculation exceed said tolerance levels.

* * * * *